United States Patent
Nevdahs et al.

(10) Patent No.: US 11,493,939 B1
(45) Date of Patent: Nov. 8, 2022

(54) PREMISE MAPPING WITH SECURITY CAMERA DRONE

(71) Applicant: Alarm.com Incorporated, Tysons, VA (US)

(72) Inventors: Ilja Nevdahs, Carnikava (LV); Agris Kipurs, Jelgava (LV)

(73) Assignee: Alarm.com Incorporated, Tysons, VA (US)

( * ) Notice: Subject to any disclaimer, the term of this patent is extended or adjusted under 35 U.S.C. 154(b) by 267 days.

(21) Appl. No.: 16/820,674

(22) Filed: Mar. 16, 2020

Related U.S. Application Data

(60) Provisional application No. 62/819,091, filed on Mar. 15, 2019.

(51) Int. Cl.
| | | |
|---|---|---|
| G05D 1/10 | (2006.01) | |
| G05D 1/00 | (2006.01) | |
| H04W 4/33 | (2018.01) | |
| B64C 39/02 | (2006.01) | |
| G01C 21/20 | (2006.01) | |

(52) U.S. Cl.
CPC ........... *G05D 1/106* (2019.05); *B64C 39/024* (2013.01); *G01C 21/206* (2013.01); *G05D 1/0094* (2013.01); *H04W 4/33* (2018.02); *B64C 2201/127* (2013.01)

(58) Field of Classification Search
CPC .... G05D 1/106; G05D 1/0094; B64C 39/024; B64C 2201/127; G01C 21/206; H04W 4/33
See application file for complete search history.

(56) References Cited

U.S. PATENT DOCUMENTS

| | | | |
|---|---|---|---|
| 9,717,387 B1* | 8/2017 | Szatmary | A47L 9/009 |
| 11,175,147 B1* | 11/2021 | Olmstead | G05D 1/0246 |
| 2015/0312774 A1* | 10/2015 | Lau | H04W 24/10 |
| | | | 455/446 |
| 2016/0031497 A1 | 2/2016 | Luo et al. | |
| 2016/0321503 A1* | 11/2016 | Zhou | G06V 20/40 |
| 2017/0225321 A1* | 8/2017 | Deyle | B25J 9/1679 |
| 2019/0236732 A1* | 8/2019 | Speasl | G06Q 50/163 |
| 2019/0375102 A1* | 12/2019 | Wang | G05D 1/024 |
| 2020/0033890 A1 | 1/2020 | Sugaki | |

FOREIGN PATENT DOCUMENTS

| | | | |
|---|---|---|---|
| CN | 108196575 B | * | 11/2020 |
| EP | 2927771 | | 10/2015 |

OTHER PUBLICATIONS

Machine Translation: CN-108196575-B (year:2020).*
Chowdhary et al., "GPS-Denied Indoor and Outdoor Monocular Vision Aided Navigation and Control of Unmanned Aircraft," Journal of Field Robotics, 2013, 45 pages.
Office Action in U.S. Appl. No. 16/819,949, dated Feb. 18, 2021, 13 pages.

* cited by examiner

*Primary Examiner* — Anne Marie Antonucci
*Assistant Examiner* — Connor L Knight
(74) *Attorney, Agent, or Firm* — Fish & Richardson P.C.

(57) ABSTRACT

A security monitoring system may implement a building space mapping process using a drone. The process involves generating a floor plan of the building space by performing pre-mapping and detailed mapping protocols, and allowing the user to specify particular areas of interest that may restrict or enhance the drone's ability to move through the building space. The drone may generate and travel along a trajectory path based on the floor plan and information collected during the mapping protocols.

20 Claims, 6 Drawing Sheets

PREMISE MAPPING WITH SECURITY CAMERA DRONE

CROSS-REFERENCE TO RELATED APPLICATION

This application claims the benefit of U.S. Application No. 62/819,091, filed Mar. 15, 2019, which is incorporated by reference.

TECHNICAL FIELD

This specification generally relates to mapping buildings using autonomous drones.

BACKGROUND

When an alarm event, such as a fire or theft, occurs at a premise, an immediate response is often required. If the alarm event occurs within a building, visibility and knowledge of the layout in the building may be important to provide an immediate response and safely navigate through the building. However, often times such knowledge is unavailable and a person living in the building may have privacy concerns regarding providing access to others even in the event of an alarm event.

SUMMARY

Innovative aspects of the subject matter described in this specification relate to mapping spaces in a building. The mapping may be performed by using a security camera drone (SCD) to obtain spatial and semantic context about the environment the SCD is located in or where an alarm event occurs in.

In some implementations, a task for a drone may include reacting to security events in a timely manner and to navigate through a premise in a manner that respects the privacy of a person who resides in the premise. In some implementations, users or installers of a monitoring system may want to restrict where the drone is allowed to travel and where it is not allowed to travel.

According to an innovative aspects of the subject matter described in this specification, a pre-mapping procedure may be performed where a user manually moves the SCD through the user's building space. The SCD records the path taken by the SCD during the user walk-through and generates a representation of the user's path and an initial floor plan. Next, a detailed mapping operation is performed in which the SCD travels through the building space based and obtains environmental data and information describing physical features in the building space. In some implementations, the path used by the SCD for detailed mapping purposes is the same as the path the user took during the walkthrough.

Based on the detailed mapping, a more detailed floor plan is generated. The more detailed floor plan can be edited to specify particular zones of interest, points of interests, and restricted zones. After further enriching the floor plan with these details, a flight mission trajectory path is generated which follows all the restrictions placed by the user. For example, the generated trajectory paths cannot enter a restricted zone to protect the privacy of a user. The SCD may then execute the flight mission trajectory path by traveling along the path and collecting more information about the building space, which could be used to provide additional information regarding an alarm event or update the floor plan.

Other implementations of this aspect include corresponding systems, apparatus, and computer programs recorded on computer storage devices, each configured to perform the operations of the methods.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
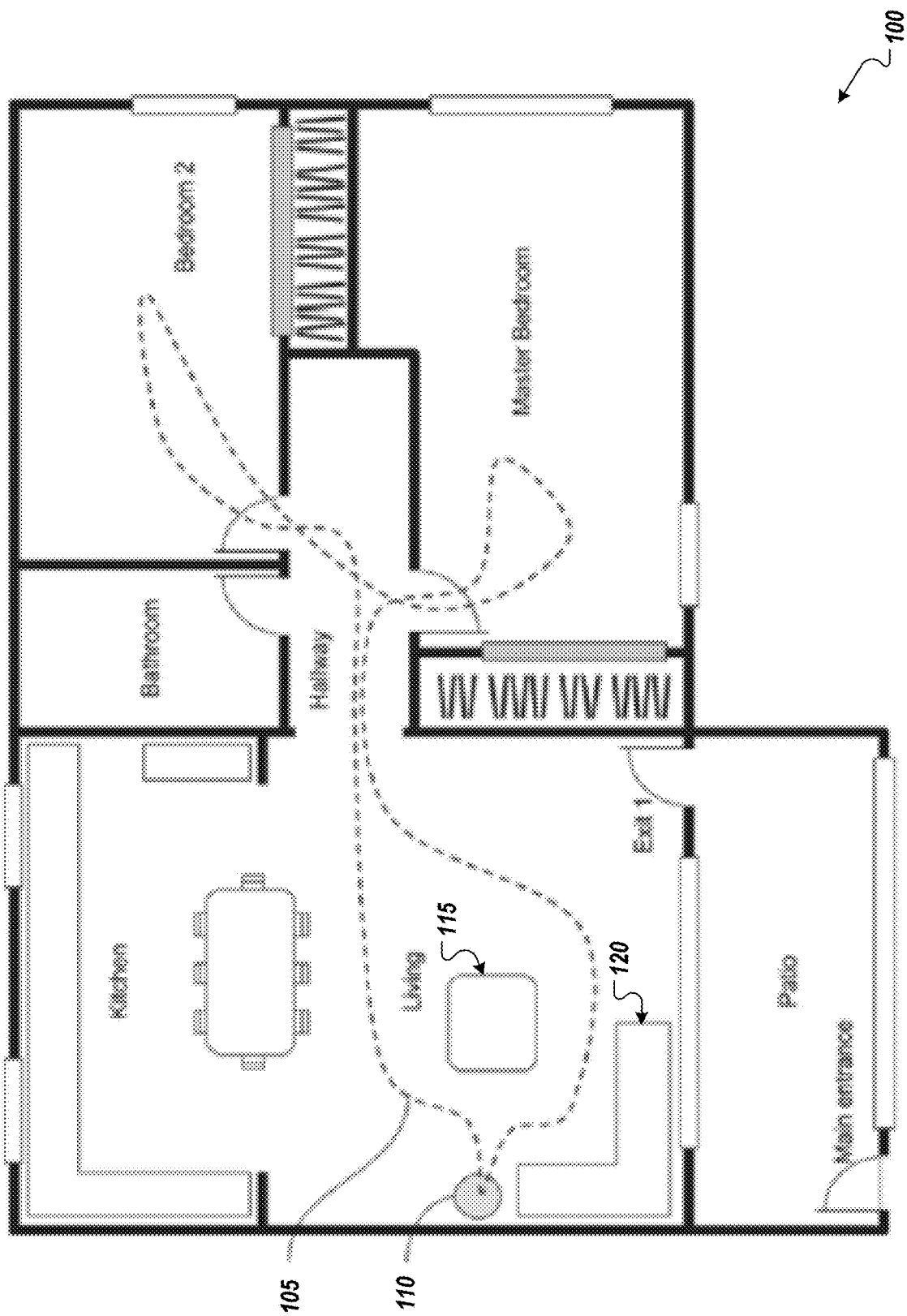
FIG. 1 illustrates a floor plan of an example property and an example pre-mapping trajectory of a drone.

Mapping of geographical zones can be beneficial for several reasons. For example, mapping a particular area allows a system that is located remotely from the particular area, to display or obtain information about the layout, configuration, and other physical features and details of the particular area. Additionally, when mapping is applied to roads and cities, mapping allows computer systems and/or users to determine various routes that can be taken to navigate through the roads and cities. Similar advantages are available when mapping is performed indoors, e.g., within a building. For example, mapping a building space can allow a user to determine the most efficient way to get from one part of a building to another part or to visualize the space inside a building.

Mapping a particular area of a building may include capturing details regarding the particular area. The details may include environmental details (e.g., temperature, humidity, pressure details), physical details (e.g., walls, impediments, rooms hallways, furniture, decorations, ceilings, floors, doors, windows, etc.), and various other types of features present in the particular area. The mapping may be performed for various reasons, including, for example to perform mapping in response to a security alarm event. Indoor mapping of buildings may however have certain constraints. For example, the presence of walls, furniture, elevators, and stairs, may impact the ability to effectively map an area as these elements may impact the ability of a mapper to access or move through the building. In addition, because building layouts have numerous different configurations and designs, it may be difficult to perform mapping in different building spaces.

The following figures and accompanying descriptions disclose implementations that describe how spaces within a premise can be mapped. The descriptions refer to a user who may be a person or entity operating an autonomous security camera drone (SCD) or interested in mapping a building space. The SCD may be part of a security monitoring system.

In general, a SCD may refer to an unmanned aerial vehicle or device (UAV). A SCD may have one or more base stations which can be used to park the SCD and/or charge the SCD. The SCD may include one or more processors, a power unit that includes a battery chamber and a charging unit, a navigation unit, one or more engines or propulsion units, and one or more sensors. The one or more processors are configured to execute compute code, such as algorithms, that, when executed, help execute operations and action performed by the SCD as described in this specification. For example, a processor may execute code that facilitates movement of the SCD from one place to another. The processor may also include or be connected to a wireless communication unit that is configured to facilitate wireless communication between the SCD and other electronic devices.

The battery chamber in the power unit includes a receptacle to hold one or more batteries that provide power to the SCD when the SCD is not connected through a wired connection to a power source. The charging unit is configured to facilitate charging of the SCD. In some implementations, the charging unit may include a port that can wirelessly communicate with another device, such as a base station, for the wireless transfer of energy to charge the SCD in a wireless manner. In some implementations, the charging unit may include a port configured to provide a wired connection to a power source such as an electric wall outlet, battery charging device, or base station. The batteries of the SCD may then be charged by virtue of the connection provided through the charging unit.

The navigation unit is configured to facilitate movement of the SCD. The navigation unit may include a processor, as described above and below, and a location determining unit, e.g., a Global Positioning System (GPS) module, to determine the real-time location of the SCD. The navigation unit may include or be connected to an accelerometer, gyroscope, compass, altimeter, motion sensor, and any other suitable devices to determine the position, orientation, and/or movement of the SCD. In some implementations, the navigation unit may include a radar to determine a distance to one or more physical objects around the SCD.

The SCD may include or be connected to one or more sensors. In general, various types of sensors may be included or connected to the SCD. For example, the sensors may include, but are not limited to, optical sensors, light sensors, air sensors, pressure sensors, temperature sensors, humidity sensors, and motion sensors. In some implementation, the sensors may include a camera to acquire still or moving images, such as images of different spaces within a building.

Using a SCD to perform mapping may be advantageous because a SCD may move through a horizontal spaces such as a floor without significant deterrence from items such as furniture that rest on the floor. In addition, with information about a particular type of layout or configuration, a SCD may be programmed to perform mapping for all buildings or spaces that have the same type of layout or configuration. This improves the efficiency and time spent mapping buildings and navigating a building during a security alarm event. In general, a security alarm event may refer to an event related to a security threat or hazard such as a theft, fire, robbery, domestic violence, break in, or personal injury.

FIG. 1 illustrates a floorplan 100 of an example property and an example pre-mapping trajectory 105 of a SCD. In the example of FIG. 1, a user may position a base station and the SCD at a base location 110. The user may be interested in mapping the floor of a building. To initiate the mapping, the user may initiate a recording through a graphical user interface on a user device, base station, or the SCD. For instance, the user may open a building space mapping application and select a mapping recording option. In some implementations, the user may give the mapping a particular name, for example, "My Apartment Floor Plan," after selecting the mapping recording option or after the mapping has been completely recorded.

After initiating the recording, the user may select an initial point to begin the mapping. In some implementations, to select the initial point, the user may physically move the SCD to the initial point and indicate that the real-time position is the initial point. In some implementations, the user may provide location coordinates of the initial point through a graphical user interface on the user device, such as a computer or smart phone, which can wirelessly transmit the location coordinate information to the SCD or a base station capable of providing instructions to the SCD. In some implementations, the user may provide location coordinates of the initial point through a user interface of the base station. In some implementations, if the user is not personally aware of the location coordinates, the user may request the SCD or base station to determine the location coordinates of the initial point after the user has moved the SCD to the initial point. The SCD and/or base station may use any location determining system, such as GPS, to determine the SCD's location coordinates.

At the initial point, the user may hold the SCD at an initial orientation, or pose, with respect to a reference point in the property, such as a door, wall, or more generally a portion of the property. At this point, the user may also check to see if components of the SCD such as sensors and/or camera are working properly and can sense the environment. In some implementations, after confirming that the SCD is working property, the user may hold the SCD and walk around the property from one room or location to another room or location until all the locations the user wants to map have been traversed. For example, the user may walk along an approximate trajectory 105 that the user wants the SCD to use for navigating through the property.

In the example trajectory 105 in FIG. 1, the user did not walk into the patio, kitchen, or bathroom. Additionally, the user walked around furniture objects 115 and 120 in the living room. While the user is carrying the SCD along the trajectory 105, the SCD may record the trajectory 105 during this pre-mapping phase and store it in the memory of the SCD or in another part of the monitoring system. For example, the SCD may determine the location coordinates of different points in the trajectory path and store the location coordinates in the memory. The location coordinates may be determined using any suitable location determining system, e.g., a Global Positioning System (GPS) system. In some implementations, the user may return the SCD to the base position 110 and/or place the SCD in the base station location located at the base position 110.

During pre-mapping phase, the user may hold the SCD and sensors in the SCD may sense the environment. For example, in some implementations, when user is moving the SCD from the initial point to a terminating point, the SCD may perform additional operations such as scanning or taking videos or pictures of the surrounding environment.

Figure 2:
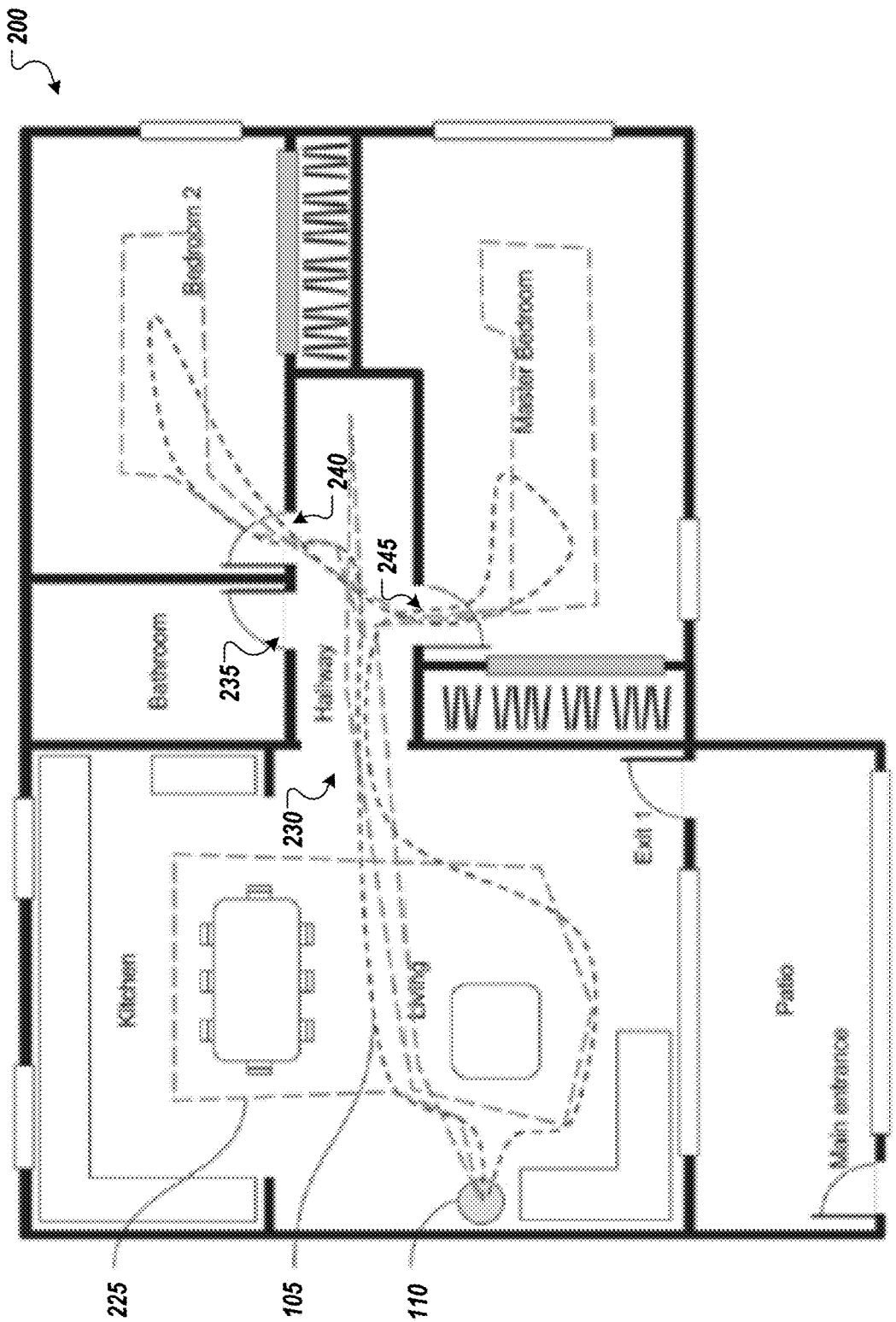
FIG. 2 illustrates a floorplan of an example property, an example pre-mapping trajectory, and an example detailed mapping trajectory.

After the walk-through is complete, the SCD may build and record a two or three-dimensional map or a graphical representation of one or more portions of the floor which the user walked through while holding the SCD. The map or graphical representation may be generated based on data collected by sensors of the SCD and/or the location coordinates of the various points traversed by the SCD during the pre-mapping phase FIG. 2 illustrates a floorplan 200 of an example property, an example pre-mapping trajectory 105, and an example detailed mapping trajectory 225. The user or the SCD may initiate a detailed mapping phase. In some implementations, the detailed mapping phase may be triggered by an external event, time, system, or trigger such as an alarm event, e.g., robbery, theft, break-in. In some implementations, the detailed mapping phase may be executed autonomously or according to a schedule and may not require any user intervention.

During the detailed mapping phase, the SCD may take off and use on-board sensors to build a two or three-dimensional map of the property. The map may include walls, furniture and other objects and structures within the property. In some implementations, the SCD may use the trajectory 105 recorded during the pre-mapping phase. The SCD may use the trajectory 105 to select a sequence or rooms to map, to favor paths the user took around objects and furniture, to identify space that the SCD has not yet mapped as well as entrances and exits for a room, and/or to avoid certain areas of the premises that were not covered during the pre-mapping phase.

In some implementations, during the detailed mapping phase, the SCD may deviate from the trajectory 105 in the event that the SCD sensors lack the range or capabilities to detect outer boundaries of the environment.

The SCD may have a radar and/or sensors communicatively coupled to one or more processors configured to execute compute code, such as algorithms, that, when executed, help to allow the SCD to identify, via sensor data obtained by the sensors and/or radar, obstructions, doors and other large openings (e.g., entrances and exits) leading to other rooms. In some implementations, the SCD may alter its trajectory path if the radar detects a likely collision with an object in its trajectory path.

The SCD may identify doors and rooms that the user did not go through and may, in response, avoid going through such doors and rooms and not map the areas beyond those doors. For example, with reference to the floorplan shown in FIGS. 1 and 2, the SCD may perform the following tasks. The SCD may start mapping in the living area. While mapping the living area, the SCD may identify a door, such as the Exit 1 door, a pathway to the kitchen, and/or an entrance 230 to the hallway. The SCD may use various suitable image processing and object detection techniques to identify objects in or around its path.

The SCD may utilize a set of rules to identify spaces and objects for mapping purposes. For example, The SCD may be configured to treat large openings (e.g., the one between the living area and the kitchen) as part of the same room and may be permitted to traverse such areas. In such a case, the SCD may map the kitchen area together with the living area. For example, if the length of an opening in an area is less than a threshold length, the SCD may determine the opening to be an entryway. If the length of an opening in an area is greater than or equal to a threshold length, the SCD may determine that the opening is a link area between two parts of the same room.

In some implementations, the SCD may determine that an opening having a length larger than a threshold length is an entrance to another room. Such an opening may be similar to the opening shown in FIGS. 1 and 2 between the living area and the kitchen area as an entrance to another room. In some implementations, if the trajectory 105 does not go through such an opening, the SCD may be forbidden from moving through that opening to perform mapping. In such a case, the SCD may map the living area and avoid flying through and mapping the kitchen area.

After mapping the living area, the SCD may determine that exit 1 cannot be traversed because the user did not go through it during the pre-mapping phase. In contrast, the trajectory 105 did go through entrance 230 from the living area to the hallway. Accordingly, after mapping the living area, the SCD may enter the hallway to map the hallway.

During the mapping of the hallway, the SCD may identify three doors 235, 240, and 245. In some implementations, the SCD may determine that door 235 cannot be traversed because the user did not go through it according to trajectory 105 during the pre-mapping phase. The SCD may determine that doors 245 and 240 can be traversed based on trajectory 105 and may enter each of them sequentially to map both bedrooms. The detailed mapping path is shown by trajectory 225, which may correspond to trajectory 105 with slight deviations based on environmental conditions during the active mapping phase.

After the SCD has mapped the rooms included in trajectory 105, the SCD may return to the base position 110 and land on the base station. The total travel path of the SCD is shown by trajectory 225.

After the detailed mapping phase is complete, the data gathered during the detailed mapping is processed to generate a floor plan of the property. In some implementations, the floor plan may include a two dimensional representation, a three dimensional representation, or another type of graphical representation of the floor plan for the building space mapped.

In some implementations, artificial intelligence and/or machine learning may be used to recognize, classify, and mark rooms, walls, doors, other structures, and furniture. The generated floor plan may be validated and refined by other computing devices or by a human operator. For example, a human operator may enter the building to verify that the generated graphical representation is consistent with the actual building space being mapped. As another example, a computing device may corroborate the location of windows, walls, and other physical features in the floor plan by comparing the generated floor plan with previously stored floor plans. The previously stored floor plans may be stored in local or remote databases, or may have been obtained from previous mapping instances.

In some implementations, if another system, such as a cloud-based system that is connected to the security monitoring system, has additional information about the property, such as locations of sensors and/or security zones, this additional information may be added to the floor plan. More generally, after a floor plan has been generated, the floor plan can be manipulated, modified, or annotated to provide additional information to the security monitoring system. The annotations may be based on information obtained from the user or from one or more sensors of the security monitoring system.

Figure 3:
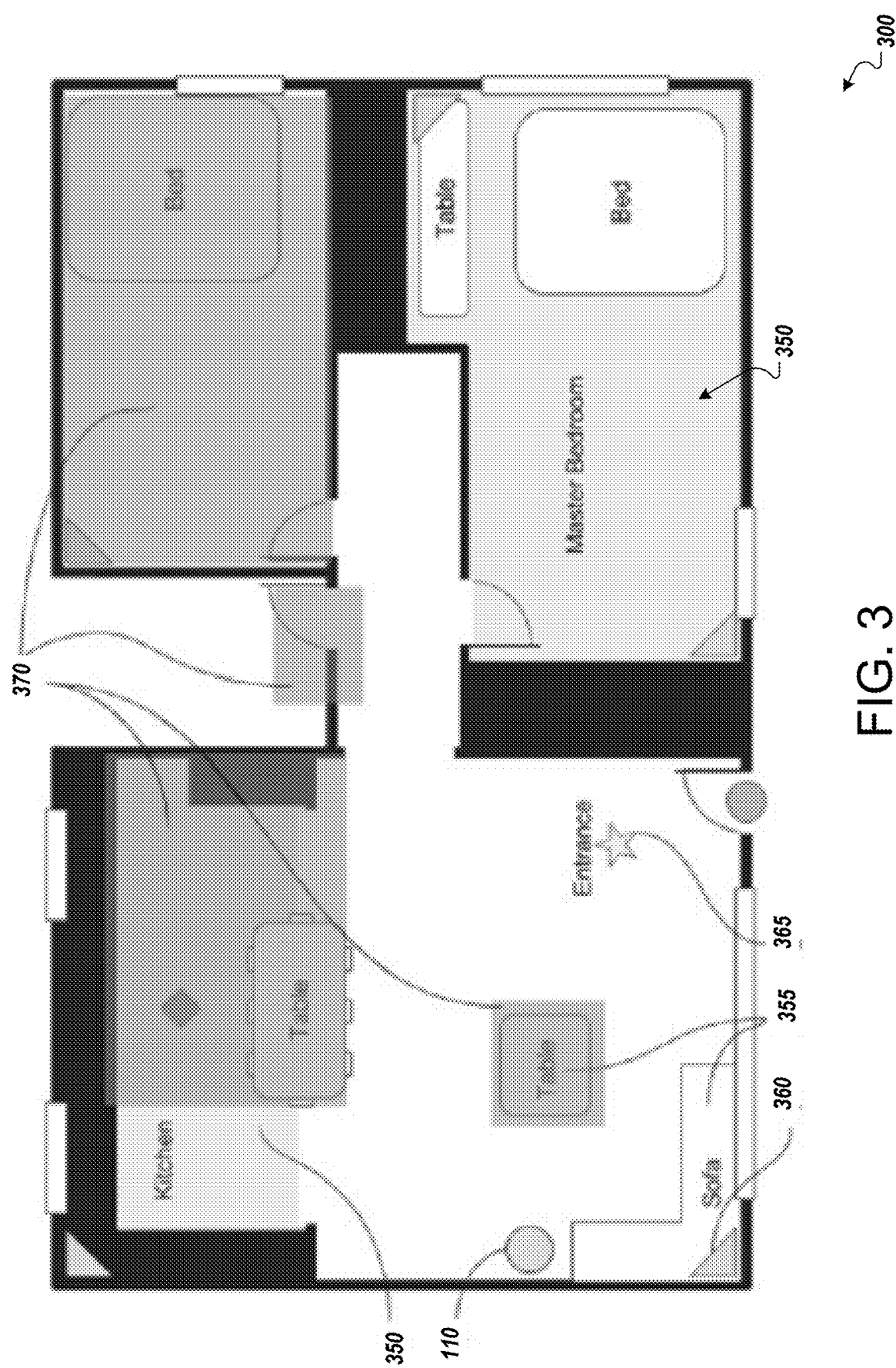
FIG. 3 illustrates an example floorplan with annotations indicating the presence of zones of interests and restriction zones.

FIG. 3 illustrates an example floorplan 300 that can be viewed by a user through a graphical user interface and can be modified by the user. The floorplan 300 may be accessible to a user through a GUI, such as a web page, computer software GUI, or mobile application GUI. The user may review the floor plan and add points of interest (POI), which may refer to specific locations on the plan, and/or zones of interest (ZOI), which may refer to rooms or parts of rooms of particular interest to the user. For example, the user may mark "Exit 1" as POI, a "Kitchen" area and "Master Bedroom" as ZOI's.

In general, the user may add any suitable type of annotation to the floorplan. For example, the user may annotate the floor plan to specify what a particular item on the floorplan is, such as table 355, which may not otherwise be apparent from a layout or aerial view. The user may also label rooms to distinguish one room from another. For example, the user may add a label to the floor plan to indicate that a room is the master bedroom and another room is a guest bedroom. Annotations to the floor plans may include various types of shapes, figures, and text.

If the floor plan contains information about security systems and/or sensors installed in the premises, as well as security zones defined, user may associate them with POI's and/or ZOI's. The annotations and input received by the user allow the user to further enhance the user's privacy and provide substantive information regarding the premise to the security monitoring system.

One particular feature that allows enhanced user privacy and control is the ability of the user to specify restricted zones. A restricted zone may refer to a zone in which the SCD or other security personnel may not enter. A restricted zone may also be referred to as a "no-fly zone" because the SCD is not allowed to enter the restricted zone.

Referring back to FIG. 3, the floor plan includes zones 370 that represent restricted zones. The regions 350 in lighter shade, such as kitchen and master bedroom, represent a security zone or ZOI. The zones may be identified by a user through a graphical user interface or may be identified by data provided by the security monitoring system. Other annotations may have been made by the user and/or using artificial intelligence or machine learning, as described above. For example, the triangular structures, one of which is labeled 360, may represent motion sensors. The diamond structure in the restricted zone may represent a smoke or fire sensor. The circular structure by the door at the bottom of FIG. 3 may represent a door lock. The star 365 may represent a POI such as an entrance area in the floor plan. Several structures, such as beds, table and sofa 355, may be labeled accordingly.

After the various zones have been designated and annotations to the floor plan have been made, the SCD may generate flight mission trajectory paths for moving the SCD from any one location in the floor plan to another location other than the restricted zone(s). For example, the SCD may generate a trajectory path from the base position 110 to one of the ZOIs, such as the master bedroom. In some implementations, the security monitoring system may determine a trajectory path of any SCD from an entry point in the property, such as entrance 365, to any location in the floor plan other than the restricted zone(s). This trajectory path can then be provided to any drone that enters the property through entrance 365 or is located at entrance 365.

The generated trajectory paths may be stored on-board on the SCD or off-board, for example in the cloud-based system or a storage system in the security monitoring system.

In some implementations, the various generated trajectory paths may be tagged with metadata providing information on the path such as its originating location, terminating location, areas or zones traversed, and any priorities associated with the trajectory path. For example, in some implementations, the trajectory path taken by the user during the pre-mapping phrase, as shown in FIG. 1, may be designated as a preferred path. Additionally, environmental data may also be tagged to the trajectory paths. The environmental data may include data indicative of obstacles (e.g., furniture and other objects) that may be within a threshold distance of the trajectory path, and data indicative of the climate in the building space such as temperature, humidity, and/or pressure.

In some implementations, metadata and environmental data may continuously be collected and updated from the time of pre-mapping to the times when the trajectory paths are traversed by the SCD. The collected data may be processed to determine optimized paths—that is, paths that may be safer or more user friendly than other trajectory path options. In this manner, the data regarding a trajectory path is continuously updated and may be used to generate safe and optimized trajectory paths.

The trajectory paths may be provided to the user through a GUI, such as a web page, computer software GUI, or mobile application GUI, so that the user may view, edit and/or delete generated trajectory paths. In some implementations, the user may use graphic tools to draw new trajectory paths, edit exiting trajectory paths, or share the trajectory paths with the SCD, cloud-based system, or security monitoring system.

Figure 4:
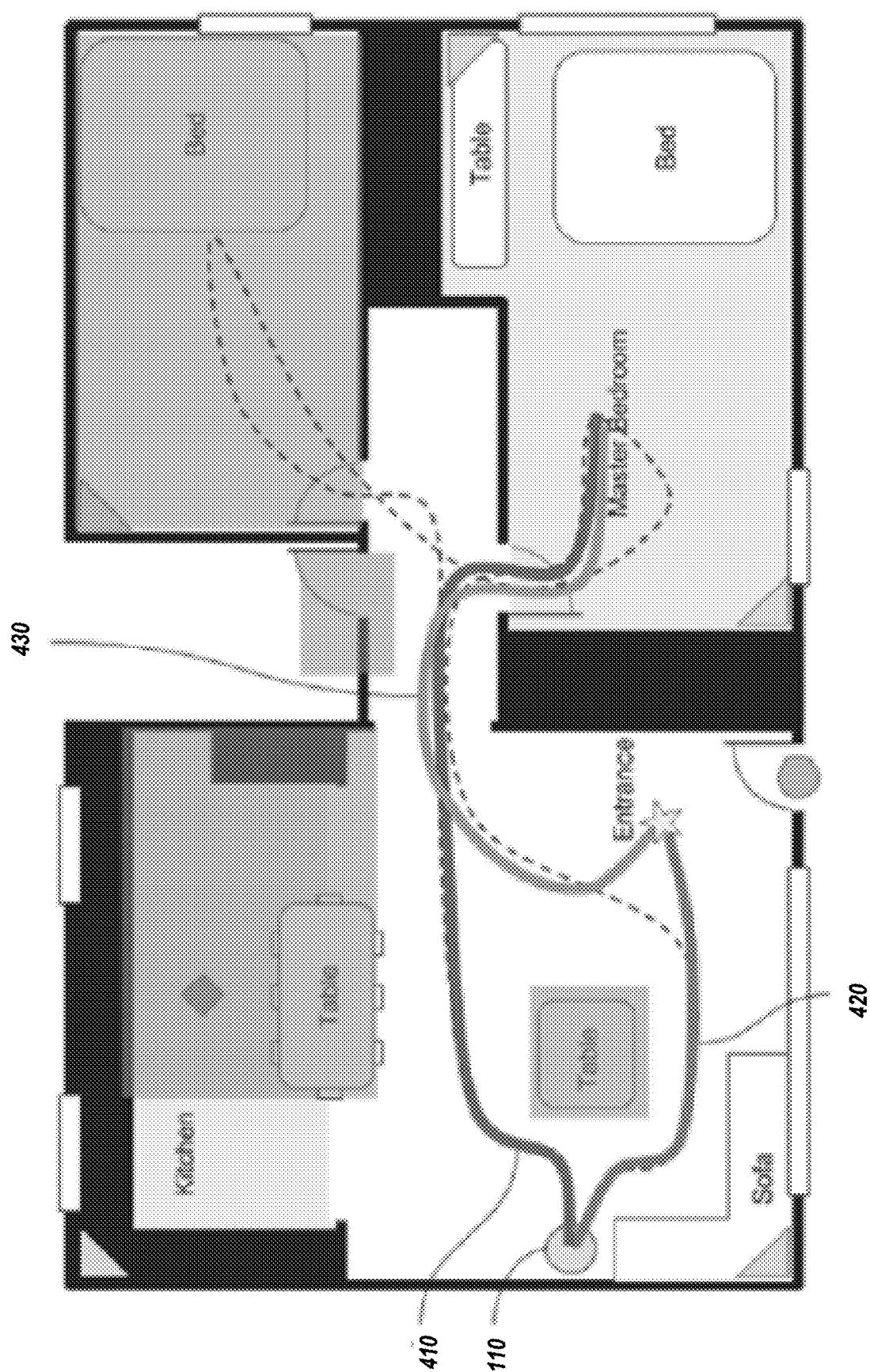
FIG. 4 illustrates an example floorplan with depictions of multiple SCD trajectory paths.

FIG. 4 depicts examples of various example trajectory paths that a SCD can take through the floor. For example, path 410 depicts a trajectory path from the base position 110 to the master bedroom ZOI. Path 420 depicts a trajectory path from the base position 110 to the Entrance POI. Path 430 depicts a trajectory path from the Entrance POI to the master bedroom ZOI.

In some cases, a user may want to reconfigure the floor plan and/or trajectory paths for a SCD. This may occur, for example, when the floor plan has undergone a significant change such as the addition of a room or removal of a wall. In some cases, the user may have moved to a new premise and may want to reconfigure the trajectory paths. In some cases, the user may have added additional security sensors or systems and may want the floor plan to show the new sensors and systems and any links they may have to certain POIs or ZOIs.

To reconfigure the floor plan and/or trajectory paths, the user may repeat the operations described above with respect to FIGS. 1-4. In some implementations, the SCD may be programmed to reconfigure the trajectory paths upon detecting a change. For example, based on data collected by its cameras and sensors, the SCD may determine that the location of the base position 110 has changed. The SCD may then update the coordinates of the base position 110. In some implementations, the SCD may receive data from sensors in the building through the security monitoring system and determine that a change in the floor plan has occurred, e.g., a new base position 110, which may also require trajectory paths starting or ending at the base position 110 to be updated.

In some implementations, the SCD may generate and output a notification to the user through the graphical user interface to confirm changes such as a change in the floor plan or a change of location of an element in the floor plan such as the base position 110. Upon receiving a confirmation from the user, the SCD may update the coordinates of the base position 110. In some implementations, the user may request the user to update the floor plans or trajectory paths by, for example, selecting an item shown on the floor plan, such as the base position 110, and requesting the SCD to obtain updated information, e.g., new coordinates, of the base position 110. After the reconfiguration, the SCD may generate new flight mission trajectory paths for any elements that are impacted by the change.

Figure 5:
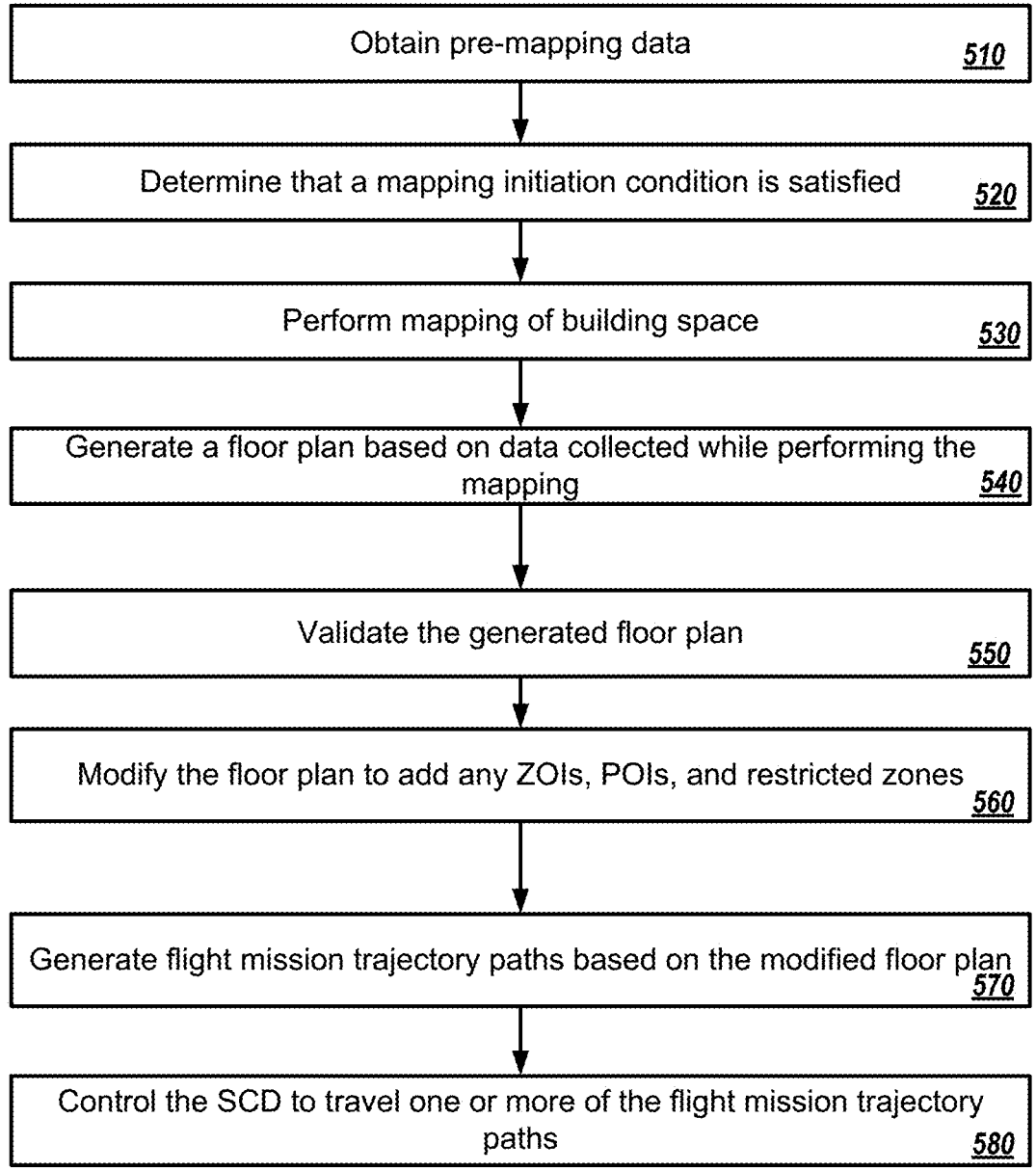
FIG. 5 depicts a flowchart of an example process to perform mapping of a building space using a SCD.

FIG. 5 depicts a flowchart of an example process 500 to perform mapping of a building space using a SCD. To begin mapping a building space, the SCD may receive an indication that a user is interested in mapping the building space. As explained above, the SCD may receive the indication as an input through a graphical user interface located on the SCD, the SCD's base station, or a user device.

In response to the input, the SCD may wait to receive an indication from the user that the user has placed the SCD at the initial point where the user would like to begin mapping. The indication may be a confirmation received through the graphical user interface that the user has placed the SCD at its starting position or initial point. In some implementations, the SCD may determine that its current location is the initial point. The coordinates of the initial point may be provided by the user or determined using a location determining system such as GPS. The SCD may also activate its sensors, cameras, radars, and other components to ensure that data is collected during the pre-mapping phase.

The SCD may begin to obtain pre-mapping data as soon as it detects movement from the initial point and contact with the hands of a person (510). The pre-mapping data obtained may include one or more of images or videos captured by the camera, data obtained by one or more sensors of the SCD such as temperature data, luminosity data, humidity data, and data indicative of the path that the user moved the SCD. Data indicative of the path that the user moved the SCD may include coordinate location information indicative of the path traveled by the SCD, elevation information indicative of the elevations at which the SCD moved, SCD orientation information indicative of the orientations of the SCD when moved by the user, and various other types of data that may include the path traversed by the SCD as well as the orientation of the SCD while the user was holding the SCD for the pre-mapping phase.

Pre-mapping data is obtained until an indication is received by the SCD that the pre-mapping phase is complete. This indication may be, for example, when the SCD stops moving for a determined period of time, e.g., 5 minutes. In some implementations, a user may provide an input indicating that the pre-mapping is complete. In some implementations, when the SCD is returned to its base station, the SCD determines that the pre-mapping phase is complete.

After obtaining the pre-mapping data, the SCD may build and store a two or three-dimensional map or a graphical representation of one or more portions of the floor which the user walked through while holding the SCD. The map or graphical representation may be generated based on pre-mapping data collected by sensors of the SCD and/or the location coordinates of the various points traversed by the SCD during the pre-mapping phase.

Next, the SCD may determine whether or not a mapping condition is satisfied (520). The mapping condition may be satisfied in various ways. For example, in some cases, the SCD may be programmed to perform a mapping of the building space periodically or according to a particular schedule. Thus, when the scheduled time or periodic time period is reached, the SCD may determine that a condition to initiate detailed mapping of the building space has been satisfied.

In some implementations, the mapping condition may be satisfied when the SCD receives data indicating that the user is interested in performing detailed mapping. In some implementations, the mapping condition may be satisfied when an alarm event occurs. If the SCD determines that a mapping condition is not satisfied, the SCD does not perform a detailed mapping operation and may remain idle or perform any other suitable operation such as a charging operation.

If the SCD determines that a mapping condition is satisfied, the SCD performs detailed mapping of the building space (530). The detailed mapping may be performed as described above with respect to FIG. 2.

After the detailed mapping phase is complete, the data collected during the detailed mapping is processed to generate a floor plan of the building space (540). In some implementations, the floor plan may include a two dimensional representation, a three dimensional representation, or another type of graphical representation of the floor plan for the mapped building space.

The SCD may then validate the generated floor plan (550) by a human operation or other computing devices as described above. After validation, the SCD may modify the floor plan based on input received from the user, the SCD sensors, or other computing devices (560). For example, as described above with respect to FIG. 3, a user may annotate the floorplan through a user interface and identify points of interest (POI), zones of interest (ZOI), and restricted zones. In some implementations, any area of the building space that the SCD did not move through by the user's movement during the pre-mapping phase may be determined to be a restricted zone.

In some implementations, the user may annotate the floor plan by providing labels or identifying objects in the floor plan that have not been clearly identified. For instance, the user may label a piece of furniture or identify one of the rooms as a master bedroom. Other modifications may be made by using artificial intelligence or machine learning or based on data received from sensors, as described above. For example, a sensor that is part of a security monitoring system may provide its location to the SCD through the security monitoring system. The SCD may then add a representation of the sensor at a corresponding location in the floor plan.

After the floor plan has been annotated and/or modified, as appropriate, the SCD may generate flight mission trajectory paths for moving the SCD from any one location in the floor plan to another location other than the restricted zone(s) (570). For example, the SCD may generate a trajectory path from the SCD's base position to one of the ZOIs, such as the master bedroom. In some implementations, the security monitoring system may determine a trajectory path of any SCD from an entry point of the building space, such as the entrance, to any location in the floor plan other than the restricted zone(s). In some implementations, the flight mission trajectory path may have the same starting and terminating point as the path that the SCD was moved by the user during the pre-mapping phase. As described above, the various generated trajectory paths may be tagged with metadata and environmental data.

The generated flight mission trajectory paths may be provided to the user through a GUI, such as a web page, computer software GUI, or mobile application GUI, so that the user may view, edit and/or delete generated trajectory paths. In some implementations, the user may use graphic tools to draw new trajectory paths, edit exiting trajectory paths, or share the trajectory paths with the SCD, cloud-based system, or security monitoring system.

The SCD may then be instructed by its own processor or from a remote device to travel on one or more of the flight mission trajectory paths (580). In some implementations, the SCD may sequentially travel through each of the generated trajectory paths. In some implementations, the SCD may receive data indicating a user preference for the SCD to travel according to one or more of the generated trajectory paths. In some implementations, the SCD may be configured to travel along the trajectory path that is closest to the location of a reported alarm event. For example, if a theft is suspected to have occurred in the master bedroom, the SCD may select the trajectory path that goes to the master bedroom through the shortest route. As another example, if a window has been broken, the SCD may select the trajectory path that has at least one portion that located in close proximity to the broken window.

As the SCD travels along a trajectory path, the SCD may continue to collect data through its sensors and update the floor plan based on the collected data. As described above, the floor plan and/or generated flight mission trajectory paths may be reconfigured based on information obtained while the SCD travels along a trajectory path. In some implementations, data collected as the SCD travels along the trajectory path may be used to provide additional information regarding an alarm event. For example, if an alarm event is triggered based on a broken window, the SCD may move towards the broken window according to one of the generated trajectory paths and take a picture that shows a baseball next to the window. This picture may be sent to the security monitoring system or user device and may indicate that the window was broken by a baseball.

Although several of the data processing operations have been described above as being performed by the SCD, these data processing operations may be executed on board the SCD or off board. For example, the processing may occur at another component of the monitoring system and/or in the cloud. For example, the SCD may be equipped with a communication circuit to communicate data directly to the cloud. In some implementations, the SCD may communicate the data to the base station, and the base station may be configured to communicate the data to the cloud or another component of the security monitoring system.

Figure 6:
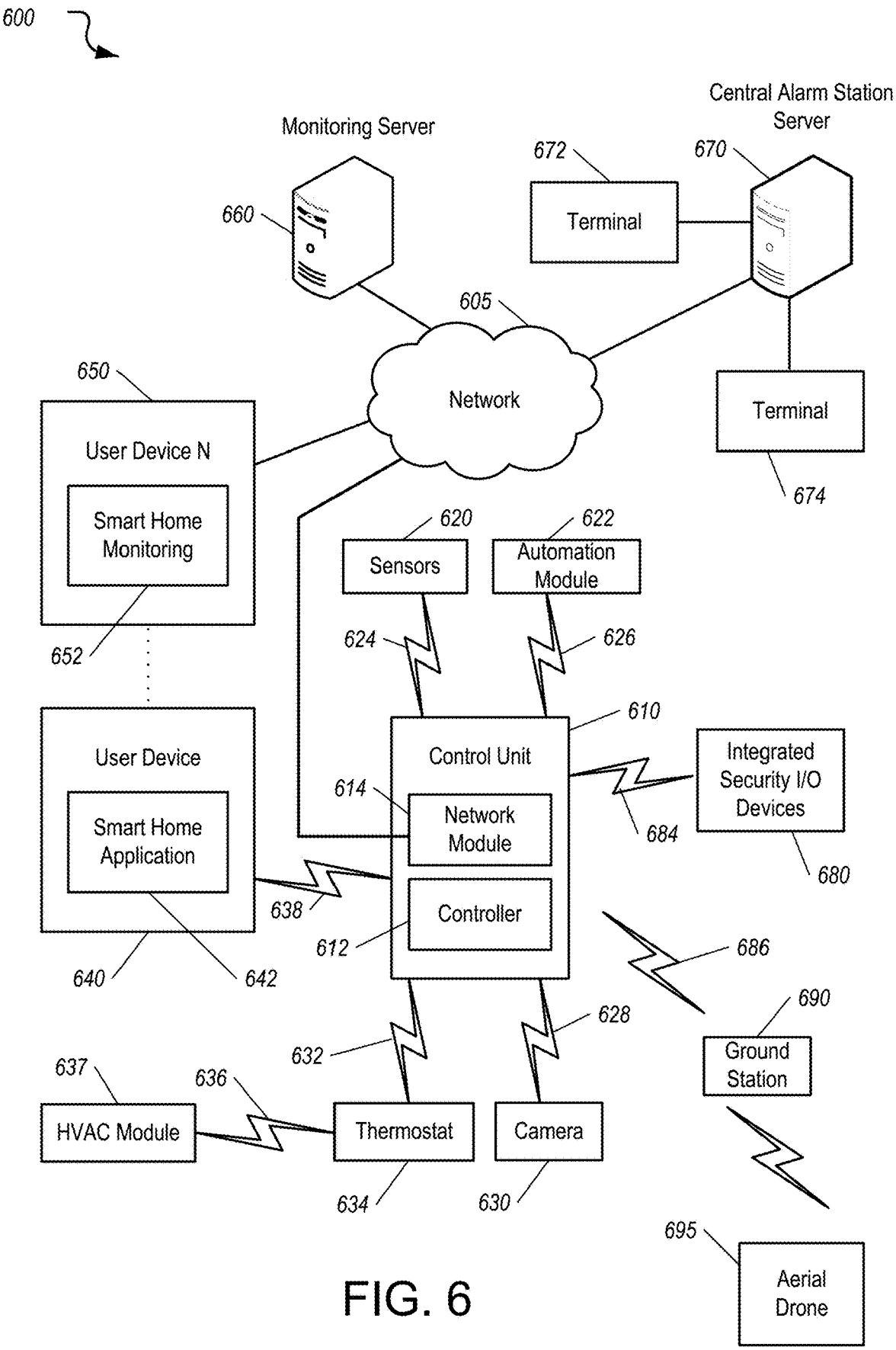
FIG. 6 depicts a block diagram of a security network system.

FIG. 6 illustrates a block diagram of an example security monitoring system 600. The monitoring system 600 includes a network 605, a control unit 610, one or more user devices 640, 650, a monitoring server 660, and a central alarm station server 670. In some examples, the network 605 facilitates communications between the control unit 610, the one or more user devices 640, 650, the monitoring server 660, and the central alarm station server 670. This example further includes a drone system that includes a base station 690 and an aerial drone 695 such as the SCD described above. In some implementations, the control unit 610 can communicate with the base station 690, the aerial drone 695, or both via a communication link 686 to provide event information such as an alarm event. The aerial drone 695 can be configured to launch based on receiving an alarm event and perform the operations described above with respect to FIGS. 1-5.

The network 605 is configured to enable exchange of electronic communications between devices connected to the network 605. For example, the network 605 can be configured to enable exchange of electronic communications between the control unit 610, the one or more user devices 640, 650, the monitoring server 660, and the central alarm station server 670. The network 605 can include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 605 can include multiple networks or subnetworks, each of which can include, for example, a wired or wireless data pathway. The network 605 can include a circuit-switched network, a packet-switched data network, or any other network able to carry electronic communications (e.g., data or voice communications). For example, the network 605 can include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 605 can include one or more networks that include wireless data channels and wireless voice channels. The network 605 can be a wireless network, a broadband network, or a combination of networks including a wireless network and a broadband network.

The control unit 610 includes a controller 612 and a network module 614. The controller 612 is configured to control a control unit monitoring system (e.g., a control unit system) that includes the control unit 610. In some examples, the controller 612 can include a processor or other control circuitry configured to execute instructions of a program that controls operation of a control unit system. In these examples, the controller 612 can be configured to receive input from sensors, flow meters, or other devices included in the control unit system and control operations of devices included in the household (e.g., speakers, lights, doors, etc.). For example, the controller 612 can be configured to control operation of the network module 614 included in the control unit 610.

The network module 614 is a communication device configured to exchange communications over the network 605. The network module 614 can be a wireless communication module configured to exchange wireless communications over the network 605. For example, the network module 614 can be a wireless communication device configured to exchange communications over a wireless data channel and a wireless voice channel. In this example, the network module 614 may transmit alarm data over a wireless data channel and establish a two-way voice communication session over a wireless voice channel. The wireless communication device can include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 614 also can be a wired communication module configured to exchange communications over the network 605 using a wired connection. For instance, the network module 614 can be a modem, a network interface card, or another type of network interface device. The network module 614 can be an Ethernet network card configured to enable the control unit 610 to communicate over a local area network and/or the Internet. The network module 614 also can be a voice band modem configured to enable the alarm panel to communicate over the telephone lines of Plain Old Telephone Systems (POTS).

The control unit system that includes the control unit 610 includes one or more sensors. For example, the monitoring system can include multiple sensors 620. The sensors 620 can include a lock sensor, a contact sensor, a motion sensor, or any other type of sensor included in a control unit system. The sensors 620 also can include an environmental sensor, such as a temperature sensor, a water sensor, a rain sensor, a wind sensor, a light sensor, a smoke detector, a carbon monoxide detector, an air quality sensor, etc. The sensors 620 further can include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 620 can include a radio-frequency identification (RFID) sensor that identifies a particular article that includes a pre-assigned RFID tag.

The control unit 610 communicates with an automation module 622 and the camera 630 to perform monitoring. The automation module 622 is connected to one or more devices that enable home automation control. For instance, the automation module 622 can be connected to one or more lighting systems and can be configured to control operation of the one or more lighting systems. The automation module 622 can be connected to one or more electronic locks at the property and can be configured to control operation of the one or more electronic locks (e.g., control Z-Wave locks using wireless communications in the Z-Wave protocol. Further, the automation module 622 can be connected to one or more appliances at the property and can be configured to control operation of the one or more appliances. The automation module 622 can include multiple modules that are each specific to the type of device being controlled in an automated manner. The automation module 622 may control the one or more devices based on commands received from the control unit 610. For instance, the automation module 622 may cause a lighting system to illuminate an area to provide a better image of the area when captured by a camera 630.

The camera 630 can be a video/photographic camera or other type of optical sensing device configured to capture images. For instance, the camera 630 can be configured to capture images of an area within a building or within a residential facility 102-A monitored by the control unit 610. The camera 630 can be configured to capture single, static images of the area and also video images of the area in which multiple images of the area are captured at a relatively high frequency (e.g., thirty images per second). The camera 630 can be controlled based on commands received from the control unit 610.

The camera 630 can be triggered by several different types of techniques. For instance, a Passive Infra-Red (PIR) motion sensor can be built into the camera 630 and used to trigger the camera 630 to capture one or more images when motion is detected. The camera 630 also can include a microwave motion sensor built into the camera and used to trigger the camera 630 to capture one or more images when motion is detected. The camera 630 may have a "normally open" or "normally closed" digital input that can trigger capture of one or more images when external sensors (e.g., the sensors 620, PIR, door/window, etc.) detect motion or other events. In some implementations, the camera 630 receives a command to capture an image when external devices detect motion or another potential alarm event. The camera 630 may receive the command from the controller 612 or directly from one of the sensors 620.

In some examples, the camera 630 triggers integrated or external illuminators (e.g., Infra-Red, Z-wave controlled "white" lights, lights controlled by the automation module 622, etc.) to improve image quality when the scene is dark. An integrated or separate light sensor can be used to determine if illumination is desired and may result in increased image quality.

The camera 630 can be programmed with any combination of time/day schedules, system "arming state," or other variables to determine whether images should be captured or not when triggers occur. The camera 630 may enter a low-power mode when not capturing images. In this case, the camera 630 may wake periodically to check for inbound messages from the controller 612. The camera 630 can be powered by internal, replaceable batteries if located remotely from the control unit 610. The camera 630 may employ a small solar cell to recharge the battery when light is available. Alternatively, the camera 630 can be powered by the controller's 612 power supply if the camera 630 is co-located with the controller 612.

The system 600 also includes thermostat 634 to perform dynamic environmental control at the property. The thermostat 634 is configured to monitor temperature and/or energy consumption of an HVAC system associated with the thermostat 634, and is further configured to provide control of environmental (e.g., temperature) settings. In some implementations, the thermostat 634 can additionally or alternatively receive data relating to activity at a property and/or environmental data at a property, e.g., at various locations indoors and outdoors at the property. The thermostat 634 can directly measure energy consumption of the HVAC system associated with the thermostat, or can estimate energy consumption of the HVAC system associated with the thermostat 634, for example, based on detected usage of one or more components of the HVAC system associated with the thermostat 634. The thermostat 634 can communicate temperature and/or energy monitoring information to or from the control unit 610 and can control the environmental (e.g., temperature) settings based on commands received from the control unit 610.

In some implementations, the thermostat 634 is a dynamically programmable thermostat and can be integrated with the control unit 610. For example, the dynamically programmable thermostat 634 can include the control unit 610, e.g., as an internal component to the dynamically programmable thermostat 634. In addition, the control unit 610 can be a gateway device that communicates with the dynamically programmable thermostat 634.

A HVAC module 637 is connected to one or more components of an HVAC system associated with a property, and is configured to control operation of the one or more components of the HVAC system. In some implementations, the HVAC module 637 is configured to monitor energy consumption of the HVAC system components, for example, by directly measuring the energy consumption of the HVAC system components or by estimating the energy usage of the one or more HVAC system components based on detecting usage of components of the HVAC system. The HVAC module 637 can communicate energy monitoring information and the state of the HVAC system components to the thermostat 634 and can control the one or more components of the HVAC system based on commands received from the thermostat 634.

The system 600 further includes one or more integrated security devices 680. The one or more integrated security devices can include any type of device used to provide alerts based on received sensor data. For instance, the one or more control units 610 may provide one or more alerts to the one or more integrated security input/output devices. Additionally, the one or more control units 610 may receive one or more sensor data from the sensors 620 and determine whether to provide an alert to the one or more integrated security input/output devices 680.

Devices such as the sensors 620, the automation module 622, the camera 630, the thermostat 634, and the integrated security devices 680 communicate with the controller 612 over communication links 624, 626, 628, 632, 684, and 686. The communication links 624, 626, 628, 632, 684, and 686 can be a wired or wireless data pathway configured to transmit signals from the sensors 620, the automation module 622, the camera 630, the thermostat 634, and the integrated security devices 680 to the controller 612. The sensors 620, the automation module 622, the camera 630, the thermostat 634, and the integrated security devices 680 may continuously transmit sensed values to the controller 612, periodically transmit sensed values to the controller 612, or transmit sensed values to the controller 612 in response to a change in a sensed value.

The communication links 624, 626, 628, 632, 684, and 686 can include a local network. The sensors 620, the automation module 622, the camera 630, the thermostat 634, and the integrated security devices 680, and the controller 612 may exchange data and commands over the local network. The local network can include 602.11 "Wi-Fi" wireless Ethernet (e.g., using low-power Wi-Fi chipsets), Z-Wave, ZigBee, Bluetooth, "Homeplug" or other "Powerline" networks that operate over AC wiring, and a Category 6 (CATS) or Category 6 (CAT6) wired Ethernet network. The local network can be a mesh network constructed based on the devices connected to the mesh network.

The monitoring server 660 is an electronic device configured to provide monitoring services by exchanging electronic communications with the control unit 610, the one or more user devices 640, 650, and the central alarm station server 670 over the network 605. For example, the monitoring server 660 can be configured to monitor events (e.g., alarm events) generated by the control unit 610. In this example, the monitoring server 660 may exchange electronic communications with the network module 614 included in the control unit 610 to receive information regarding events (e.g., alerts) detected by the central alarm station server 670. The monitoring server 660 also may receive information regarding events (e.g., alerts) from the one or more user devices 640, 650.

In some implementations, the monitoring server 660 may route alert data received from the network module 614 or the one or more user devices 640, 650 to the central alarm station server 670. For example, the monitoring server 660 may transmit the alert data to the central alarm station server 670 over the network 605. The monitoring server 660 may store sensor and image data received from the monitoring system and perform analysis of sensor and image data received from the monitoring system. Based on the analysis, the monitoring server 660 may communicate with and control aspects of the control unit 610 or the one or more user devices 640, 650.

The central alarm station server 670 is an electronic device configured to provide alarm monitoring service by exchanging communications with the control unit 610, the one or more user devices 640, 650, and the monitoring server 660 over the network 605. For example, the central alarm station server 670 can be configured to monitor alerting events generated by the control unit 610. In this example, the central alarm station server 670 may exchange communications with the network module 614 included in the control unit 610 to receive information regarding alerting events detected by the control unit 610. The central alarm station server 670 also may receive information regarding alerting events from the one or more user devices 640, 650 and/or the monitoring server 660.

The central alarm station server 670 is connected to multiple terminals 672 and 674. The terminals 672 and 674 can be used by operators to process alerting events. For example, the central alarm station server 670 may route alerting data to the terminals 672 and 674 to enable an operator to process the alerting data. The terminals 672 and 674 can include general-purpose computers (e.g., desktop personal computers, workstations, or laptop computers) that are configured to receive alerting data from a server in the central alarm station server 670 and render a display of information based on the alerting data. For instance, the controller 612 may control the network module 614 to transmit, to the central alarm station server 670, alerting data indicating that a motion detection from a motion sensor via the sensors 620. The central alarm station server 670 may receive the alerting data and route the alerting data to the terminal 672 for processing by an operator associated with the terminal 672. The terminal 672 may render a display to the operator that includes information associated with the alerting event (e.g., the lock sensor data, the motion sensor data, the contact sensor data, etc.) and the operator may handle the alerting event based on the displayed information.

In some implementations, the terminals 672 and 674 can be mobile devices or devices designed for a specific function. Although FIG. 6 illustrates two terminals for brevity, actual implementations can include more (and, perhaps, many more) terminals. The one or more user devices 640, 650 are devices that host and display user interfaces. For instance, the user device 640 is a mobile device that hosts one or more native applications (e.g., the smart home application 642). The user device 640 can be a cellular phone or a non-cellular locally networked device with a display. The user device 640 can include a cell phone, a smart phone, a tablet PC, a personal digital assistant ("PDA"), or any other portable device configured to communicate over a network and display information. For example, implementations may also include mobile communication devices, tablets, electronic organizers, portable music players, other communication devices, and handheld or portable electronic devices for gaming, communications, and/or data organization. The user device 640 may perform functions unrelated to the monitoring system, such as placing personal telephone calls, playing music, playing video, displaying pictures, browsing the Internet, maintaining an electronic calendar, etc.

The user device 640 includes a smart home application 642. The smart home application 642 refers to a software/firmware program running on the corresponding mobile device that enables the user interface and features described throughout. The user device 640 may load or install the smart home application 642 based on data received over a network or data received from local media. The smart home application 642 runs on mobile devices platforms, such as iPhone, iPod touch, Google Android, Windows Mobile, etc. The smart home application 642 enables the user device 640 to receive and process image and sensor data from the monitoring system. The smart home application 642 may include a building space mapping application described above through which the user may interact with a graphical user interface and provide inputs for performing the operations described above with respect to FIGS. 1-5.

The user device 650 can be a general-purpose computer (e.g., a desktop personal computer, a workstation, or a laptop computer) that is configured to communicate with the monitoring server 660 and/or the control unit 610 over the network 605. The user device 650 can be configured to display a smart home user interface 652 that is generated by the user device 650 or generated by the monitoring server 660. For example, the user device 650 can be configured to display a user interface (e.g., a web page) provided by the monitoring server 660 that enables a user to perceive images captured by the camera 630 and/or reports related to the monitoring system. Although FIG. 6 illustrates two user devices for brevity, actual implementations can include more (and, perhaps, many more) or fewer user devices.

In some implementations, the one or more user devices 640, 650 communicate with and receive monitoring system data from the control unit 610 using the communication link 638. For instance, the one or more user devices 640, 650 may communicate with the control unit 610 using various local wireless protocols such as Wi-Fi, Bluetooth, Zwave, ZigBee, HomePlug (Ethernet over powerline), or wired protocols such as Ethernet and USB, to connect the one or more user devices 640, 650 to local security and automation equipment. The one or more user devices 640, 650 may connect locally to the monitoring system and its sensors and other devices. The local connection may improve the speed of status and control communications because communicating through the network 605 with a remote server (e.g., the monitoring server 660) can be significantly slower.

Although the one or more user devices 640, 650 are shown as communicating with the control unit 610, the one or more user devices 640, 650 may communicate directly with the sensors 620 and other devices controlled by the control unit 610. In some implementations, the one or more user devices 640, 650 replace the control unit 610 and perform the functions of the control unit 610 for local monitoring and long range/offsite communication.

In other implementations, the one or more user devices 640, 650 receive monitoring system data captured by the control unit 610 through the network 605. The one or more user devices 640, 650 may receive the data from the control unit 610 through the network 605 or the monitoring server 660 may relay data received from the control unit 610 to the one or more user devices 640, 650 through the network 605. In this regard, the monitoring server 660 may facilitate communication between the one or more user devices 640, 650 and the monitoring system.

In some implementations, the one or more user devices 640, 650 can be configured to switch whether the one or more user devices 640, 650 communicate with the control unit 610 directly (e.g., through link 638) or through the monitoring server 660 (e.g., through network 605) based on a location of the one or more user devices 640, 650. For instance, when the one or more user devices 640, 650 are located close to the control unit 610 and in range to communicate directly with the control unit 610, the one or more user devices 640, 650 use direct communication. When the one or more user devices 640, 650 are located far from the control unit 610 and not in range to communicate directly with the control unit 610, the one or more user devices 640, 650 use communication through the monitoring server 660.

In some implementations, the one or more user devices 640, 650 are used in conjunction with local sensors and/or local devices in a house. In these implementations, the system 600 includes the one or more user devices 640, 650, the sensors 620, the automation module 622, and the camera 630. The one or more user devices 640, 650 receive data directly from the sensors 620, the automation module 622, and the camera 630, and send data directly to the sensors 620, the automation module 622, and the camera 630. The one or more user devices 640, 650 provide the appropriate interfaces/processing to provide visual surveillance and reporting. In some implementations, the system 600 provides end users with access to images captured by the camera 630 to aid in decision making. The system 600 may transmit the images captured by the camera 630 over a wireless WAN network to the user devices 640, 650.

In some implementations, a state of the monitoring system and other events sensed by the monitoring system can be used to enable/disable video/image recording devices (e.g., the camera 630). In these implementations, the camera 630 can be set to capture images on a periodic basis when the alarm system is armed in an "Away" state, but set not to capture images when the alarm system is armed in a "Stay" state or disarmed. In addition, the camera 630 can be triggered to begin capturing images when the alarm system detects an event, such as an alarm event, a door-opening event for a door that leads to an area within a field of view of the camera 630, or motion in the area within the field of view of the camera 630. In other implementations, the camera 630 may capture images continuously, but the captured images can be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented using one or more computer programs or non-transitory computer-readable storage media that includes instructions that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example, semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

Computer-readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program, also known as a program, software, software application, script, plug-in, or code, may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data in a single file dedicated to the program in question, or in multiple coordinated files. A computer program may be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer may not have such devices. Moreover, a computer may be embedded in another device, e.g., a tablet computer, a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and may even be claimed as such, one or more features from a claimed combination may, in some cases, be excised from the combination, and the claimed combination may be directed to a sub-combination or variation of a sub-combination. For example, although the mapping operation is described as a series of discrete operations, the various operations may be divided into additional operations, combined into fewer operations, varied in order of execution, or eliminated, depending on the desired implementation.

Similarly, the separation of various system components in the embodiments described above should not be understood as requiring such separation in all embodiments, and it should be understood that the described program components and systems may generally be integrated together in a single software product or packaged into multiple software products. For example, although some operations are described as being performed by a processing server, one of more of the operations may be performed by the smart meter or other network components.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner. Additionally, the terms "about," "substantially," or "approximately" should be interpreted to mean a value within 10% of an actual value, for example, values like 3 mm or 100% (percent).

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure. Thus, particular implementations have been described. Other implementations are within the scope of the following claims. For example, the actions recited in the claims may be performed in a different order and still achieve desirable results.

What is claimed is:

1. A system comprising:
    one or more processors and one or more storage devices storing instructions that are operable, when executed by the one or more processors, to cause the one or more processors to perform operations comprising:
        obtaining pre-mapping data along a non-flight trajectory path of a drone taken while the drone was held by a user that traverses a building space;
        after obtaining the pre-mapping data, mapping the traversed building space using the non-flight trajectory path and the obtained pre-mapping data;
        obtaining mapping data during the mapping of the building space;
        generating a floor plan using the mapping data;
        determining a restricted zone using both the floor plan and rooms of the building space that the user did not move through while the drone was held by the user; and
        sending one or more signals to the drone to cause the drone to move according to a flight trajectory path determined using the floor plan and the restricted zone.

2. The system of claim 1, wherein obtaining the pre-mapping data along the non-flight trajectory path of the drone taken while the drone was held by the user that moved within the building space comprises:
    receiving data indicating that the user is interested in mapping the building space;
    determining that the drone is located at an initial point to begin pre-mapping the building space; and
    determining to stop obtaining pre-mapping data in response to determining that the drone is located at a base station.

3. The system of claim 1, wherein obtaining the pre-mapping data along the non-flight trajectory path of the drone comprises one or more of:
    obtaining an image or a video captured by the camera;
    obtaining, from one or more sensors, environmental data indicative of environmental conditions along the non-flight trajectory path; and
    obtaining location information indicative of the non-flight trajectory path and elevation information indicative of elevations at which the SCD moved along the non-flight trajectory path.

4. The system of claim 1, wherein the operations further comprise:
    determining that a mapping condition is satisfied upon occurrence of one or more of:
        determining that an alarm event has occurred;
        receiving data indicating that the user is interested in mapping the building space; and
        determining that a particular time for performing the mapping according to a particular schedule has been reached; and
    wherein the mapping is performed in response to the mapping condition being satisfied.

5. The system of claim 1, wherein the operations further comprise validating the generated floor plan by comparing the generated floor plan with a floor plan stored in a database.

6. The system of claim 1, wherein the operations further comprise:
    receiving data indicative of a point of interest and a zone of interest; and
    modifying the floor plan to include the point of interest, the zone of interest, or both the point of interest and the zone of interest.

7. The system of claim 1, wherein the non-flight trajectory path corresponds to a path taken by the drone when moved by the user through the building space.

8. The system of claim 1, wherein determining the restricted zone using the floor plan comprises:
    determining a zone that was not traversed by the non-flight trajectory path; and
    identifying the zone that was not traversed by the non-flight trajectory path as the restricted zone.

9. The system of claim 1, wherein moving the drone according to the flight trajectory path determined using both the floor plan and the restricted zone comprises:
    determining the flight trajectory path such that the drone does not enter the restricted zone.

10. The system of claim 1, wherein the mapping data comprises:
- metadata indicative of an originating location of the drone when performing the mapping, a terminating location when performing the mapping, areas or zones traversed when performing the mapping, and any priorities associated with a trajectory path associated with the mapping; and
- environmental data indicative of i) obstacles that may be within a threshold distance of the trajectory path associated with the mapping, and ii) a climate in the building space.

11. A computer-implemented method, comprising:
- obtaining pre-mapping data along a non-flight trajectory path of a drone taken while the drone was held by a user that traverses a building space;
- after obtaining the pre-mapping data, mapping the traversed building space using the non-flight trajectory path and the obtained pre-mapping data;
- obtaining mapping data during the mapping of the building space;
- generating a floor plan using the mapping data;
- determining a restricted zone using both the floor plan and rooms of the building space that the user did not move through while the drone was held by the user; and
- sending one or more signals to the drone to cause the drone to move according to a flight trajectory path determined using the floor plan and the restricted zone.

12. The computer-implemented method of claim 11, wherein obtaining the pre-mapping data along the non-flight trajectory path of the drone taken while the drone was held by the user that moved within the building space comprises:
- receiving data indicating that the user is interested in mapping the building space;
- determining that the drone is located at an initial point to begin pre-mapping the building space; and
- determining to stop obtaining pre-mapping data in response to determining that the drone is located at a base station.

13. The computer-implemented method of claim 11, obtaining the pre-mapping data along the non-flight trajectory path of the drone comprises one or more of:
- obtaining an image or a video captured by the camera;
- obtaining, from one or more sensors, environmental data indicative of environmental conditions along the non-flight trajectory path; and
- obtaining location information indicative of the non-flight trajectory path and elevation information indicative of elevations at which the SCD moved along the non-flight trajectory path.

14. The computer-implemented method of claim 11, further comprising:
- determining that a mapping condition is satisfied upon occurrence of one or more of:
  - determining that an alarm event has occurred;
  - receiving data indicating that the user is interested in mapping the building space; and
  - determining that a particular time for performing the mapping according to a particular schedule has been reached; and
- wherein the mapping is performed in response to the mapping condition being satisfied.

15. The computer-implemented method of claim 11, further comprising:
- receiving data indicative of a point of interest and a zone of interest; and
- modifying the floor plan to include the point of interest, the zone of interest, or both the point of interest and the zone of interest.

16. The computer-implemented method of claim 11, wherein the non-flight trajectory path corresponds to a path taken by the drone when moved by the user through the building space.

17. The computer-implemented method of claim 11, wherein determining the restricted zone using the floor plan comprises:
- determining a zone that was not traversed by the non-flight trajectory path; and
- identifying the zone that was not traversed by the non-flight trajectory path as the restricted zone.

18. The computer-implemented method of claim 11, wherein moving the drone according to the flight trajectory path determined using the both the floor plan and the restricted zone comprises:
- determining the flight trajectory path such that the drone does not enter the restricted zone.

19. The computer-implemented method of claim 11, wherein the mapping data comprises:
- metadata indicative of an originating location of the drone when performing the mapping, a terminating location when performing the mapping, areas or zones traversed when performing the mapping, and any priorities associated with a trajectory path associated with the mapping; and
- environmental data indicative of i) obstacles that may be within a threshold distance of the trajectory path associated with the mapping, and ii) a climate in the building space.

20. A non-transitory computer-readable storage medium comprising instructions, which, when executed by one or more computer processors, cause the one or more computer processors to perform operations comprising:
- obtaining pre-mapping data along a non-flight trajectory path of a drone taken while the drone was held by a user that traverses a building space;
- after obtaining the pre-mapping data, mapping the traversed building space using the non-flight trajectory path and the obtained pre-mapping data;
- obtaining mapping data during the mapping of the building space;
- generating a floor plan using the mapping data;
- determining a restricted zone using both the floor plan and rooms of the building space that the user did not move through while the drone was held by the user; and
- sending one or more signals to the drone to cause the drone to move according to a flight trajectory path determined using the both the floor plan and the restricted zone.

* * * * *